(12) United States Patent
Cordes et al.

(10) Patent No.: US 6,531,881 B1
(45) Date of Patent: Mar. 11, 2003

(54) MEASUREMENT ARRANGEMENT

(75) Inventors: Paul Cordes, Whitley Bay (GB); Philip McGonnell, Horsham (GB); Peter Ward, Cramlington (GB); Andrew John Fraser, Ashbrooke (GB)

(73) Assignee: Transco PLC, London (GB)

( * ) Notice: Subject to any disclaimer, the term of this patent is extended or adjusted under 35 U.S.C. 154(b) by 0 days.

(21) Appl. No.: 09/068,015

(22) PCT Filed: Nov. 1, 1996

(86) PCT No.: PCT/GB96/02692

§ 371 (c)(1),
(2), (4) Date: Nov. 30, 1998

(87) PCT Pub. No.: WO97/16700

PCT Pub. Date: May 9, 1997

(Under 37 CFR 1.47)

(30) Foreign Application Priority Data

Nov. 1, 1995 (GB) .............................................. 9522378

(51) Int. Cl.$^7$ ................................................ G01V 3/12
(52) U.S. Cl. .......................... 324/644; 324/637; 342/22
(58) Field of Search .................................. 324/699, 334, 324/337, 533, 534, 635, 644, 669, 639; 342/22, 27, 126, 118

(56) References Cited

U.S. PATENT DOCUMENTS

| 3,634,753 | A | * | 1/1972 | Unterberger | ................. 324/337 |
| 4,745,803 | A | * | 5/1988 | Haavasoja | ................ 73/170.26 |
| 5,384,715 | A | * | 1/1995 | Lytton | .......................... 702/12 |
| 5,497,100 | A | * | 3/1996 | Reiser et al. | ................ 324/643 |
| 5,835,053 | A | * | 11/1998 | Davis | .......................... 342/22 |

* cited by examiner

Primary Examiner—Christine Oda
Assistant Examiner—Vincent Q. Nguyen
(74) Attorney, Agent, or Firm—Oblon, Spivak, McClelland, Maier & Neustadt, P.C.

(57) ABSTRACT

A measuring device for determining the thickness of a non-homogeneous medium such as the thickness of a road structure. The device includes a radar transmitter and two spaced receivers. Information on the timing of the transmitted signal as well as the signals received by the two receivers is used to calculate the material thickness while eliminating signal drift.

28 Claims, 5 Drawing Sheets

MEASUREMENT ARRANGEMENT

BACKGROUND OF THE INVENTION

1. Field of the Invention

The invention relates to a measurement arrangement typically for road thickness measurement.

2. Discussion of the Background

Civil engineering materials are often non-homogenous comprising a matrix of two or more products with different particle size and physical properties.

FIG. 1 shows part of a typical road structure with a wearing surface layer and a sub base layer of courser material.

Typical of these materials are concrete asphalt and bituminous macadam. When these materials are used as surfacing or cladding for structures such as roads and buildings, it is sometimes necessary to measure the thickness of the surfacing to establish the engineering strength of the structure.

The usual method of measuring the thickness of these materials is to take samples of the material using a coring tool. This can give a very accurate measure if properly used but it suffers from a number of disadvantages. The integrity of the original surface is destroyed by taking a core sample and even if properly repaired it may lead to early deterioration of the surface. Coring of small area structures such as road reinstatements is impractical as the area of the core may be a substantial fraction of the area of the reinstatement. A core sample provides only a spot measurement which may not be representative of the general condition of the rest of the structure.

Non intrusive measurement techniques have proved difficult due to the non-homogenous matrix of materials employed in such structures.

SUMMARY OF THE INVENTION

According to the invention there is provided a device for measuring the thickness of a non-homogenous medium and comprising means for transmitting pulses of electromagnetic energy through the material; first means for receiving a first reflected energy signal; second means spaced from the first means for receiving a second reflected energy signal; and, means for calculating material thickness using information derived from both the first and second reflected signals.

According to a further aspect of the invention there is provided a pulse radar method applicable to the calculation of the thickness of a non-homogenous meduim, comprising passing into the medium from a first location at the outer surface, a pulse of electromagnetic energy and receiving at second and third locations at the surface a reflected pulse and calculating the material thickness using information derived from both received and reflected pulses.

BRIEF DESCRIPTION OF THE DRAWINGS

The invention will now be described by way of example with reference to the accompanying drawings in which.

DISCUSSION OF THE PREFERRED EMBODIMENTS

Figure 1:
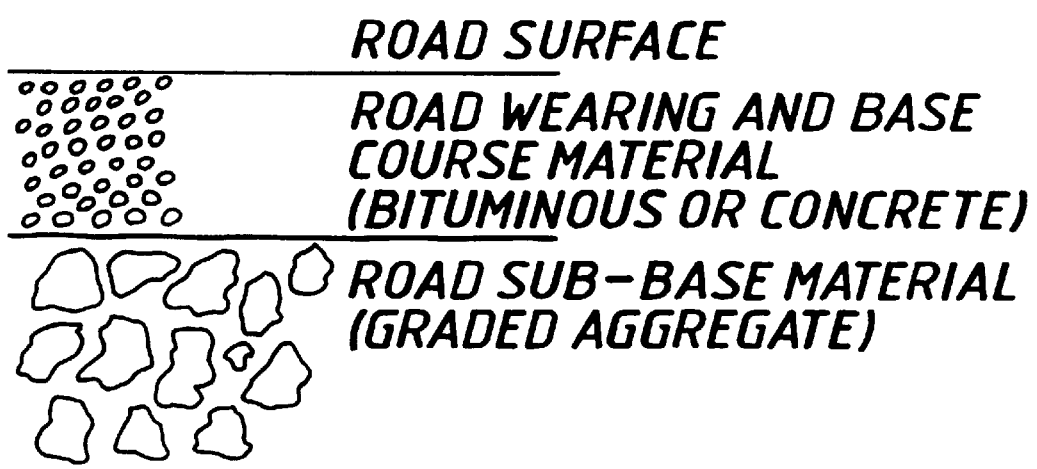
FIG. 1 shows a typical road structure arrangement.
Figure 2:
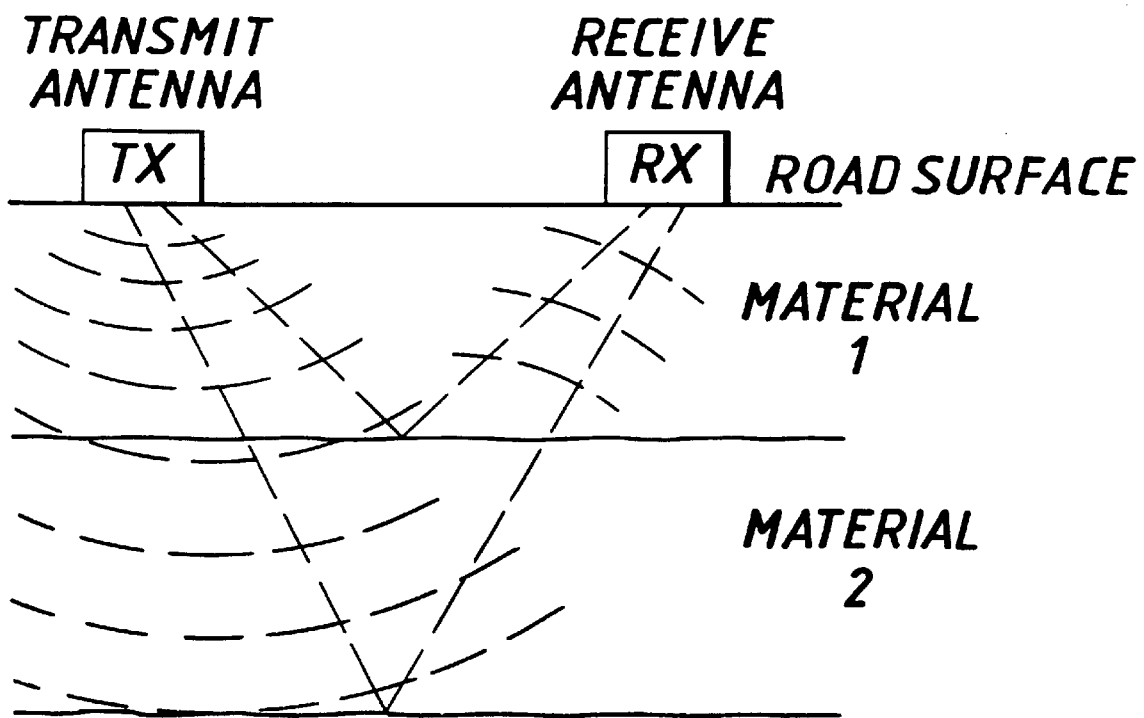
FIG. 2 shows a radar arrangement forming the basis for measuring the thickness of non-homogenous surfacing materials.

FIG. 2 shows the behaviour of a radar signal when passing through a plurality of layers in the road structure and its subsequent receipt.

The operation of the instrument for measuring the thickness of these non-homogenous surfacing materials uses the time of flight of an electromagnetic impulse reflected from the interface between the surfacing material and the underlying material. A microwave antenna Tx acting as a transmitter, placed on the outer surface, injects an impulse of electromagnetic energy into the material. The impulse is reflected from interfaces between layers of material with different conductivity and permeability, the strength of the reflection being dependent on the differences in electrical parameters. The reflected impulses are detected by a second antenna Rx at the surface which acts as a receiver. The time taken for the signal to make the round trip from the transmitter, through the material and back to the receiver is related to the depth or thickness of the sample as follows:

$$v \cdot t_1 = 2\sqrt{\left(\frac{x_1}{2}\right)^2 + d^2}$$

Figure 3:
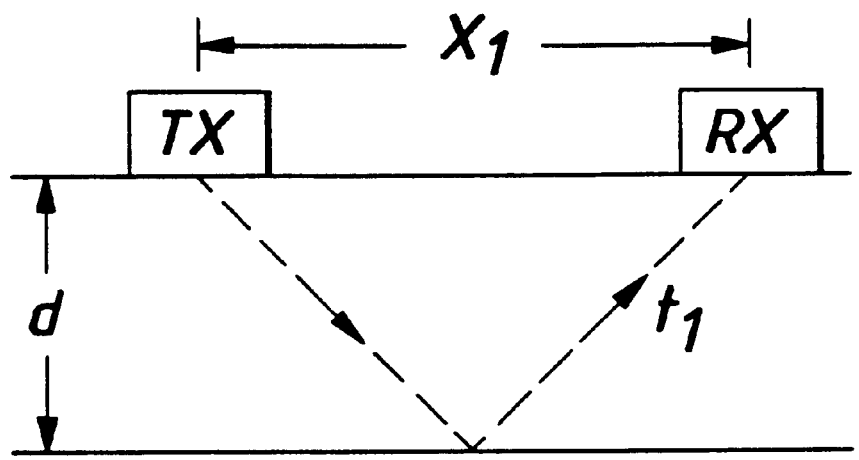
FIG. 3 shows the calculation mechanism in more detail.

If the propagation time ($t_1$) of the signal can be measured and the velocity (v) of the signal in the material is known then since the separation ($x_1$) of the transmit and receive antennas is also known, then the depth (d) can be calculated as illustrated in FIG. 3.

However, with most civil engineering materials the constituents may change significantly between samples and this may result in changes to the velocity of the electromagnetic waves in the material. This in turn affects the estimation of material thickness and large errors can be obtained unless the actual velocity of the material is known. A feature of this invention is to produce a method of measuring material thickness independent of velocity.

Figure 4:
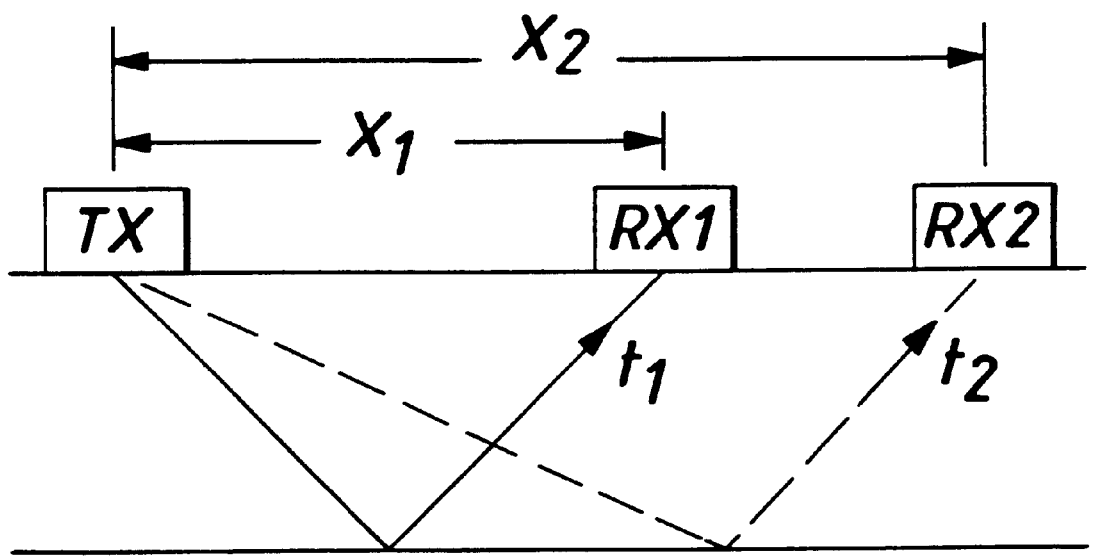
FIG. 4 shows an improved arrangement employing two receivers.

In the improved arrangement of FIG. 4, this is achieved by using a second receive antenna (RX2), positioned on the surface, in line with the first receive antenna (RX1) but at a greater distance (x2) from the transmitter. If the time (t2) for the impulse from the transmitter to reach the second receiver is measured then the depth of the material can be estimated from the relationship:

$$d = \frac{\sqrt{(t_1 x_2)^2 - (t_2 x_1)^2}}{4(t_2^2 - t_1^2)}$$

The Measurement of Propagation Time

The accuracy and resolution of the measurement technique is dependent, amongst other things, on the frequency content of the electromagnetic impulse that is transmitted into the ground. Typically, measurement of surface layer thicknesses from 50 mm to 300 mm is required, with an accuracy of better than ±10 mm. This accuracy was achieved by generating a very short voltage impulse with an amplitude of 15 V and a duration of 350 picoseconds. Most of this signal is fed to the transmit antenna but about 10% is extracted and fed to the receive circuits for use as a timing reference. The transmit antenna converts the voltage impulse into an electromagnetic impulse which radiates into ground. The electromagnetic impulse is partially reflected from material boundaries with different electrical properties. On reaching the surface, the reflected impulse is detected by the receive antennas, which convert the electromagnetic impulse into a voltage impulse.

Figure 5:
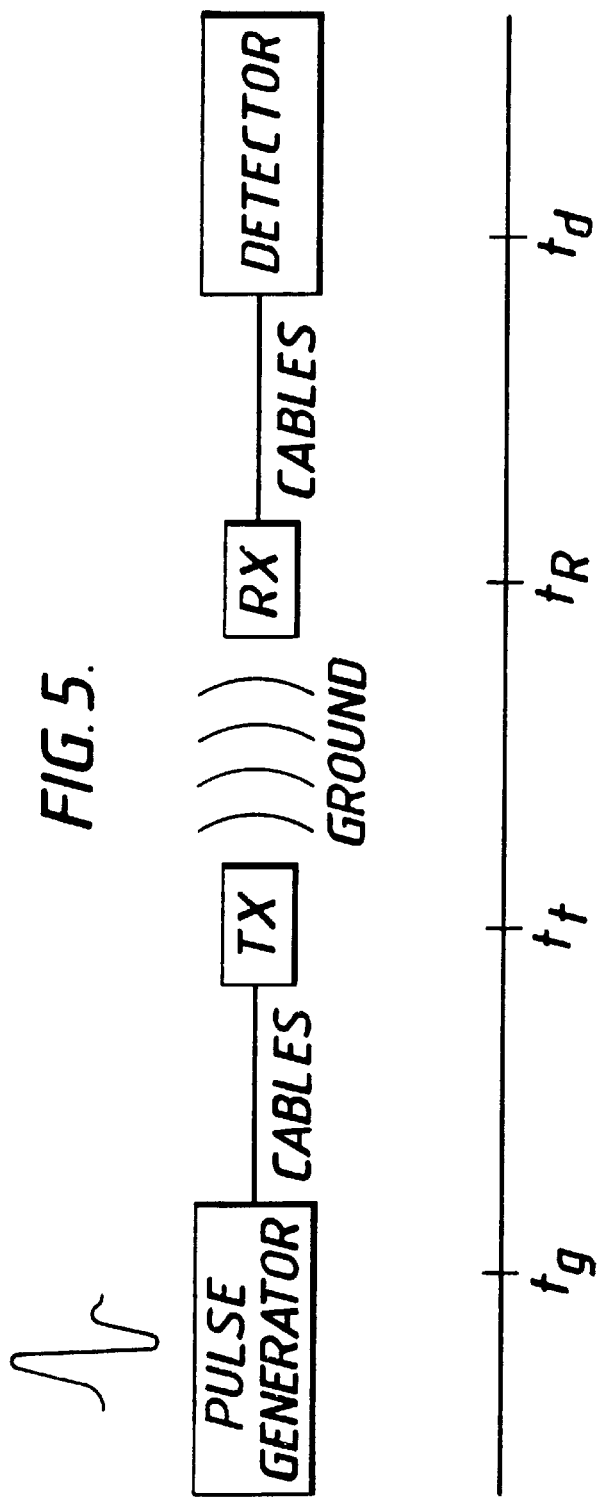
FIG. 5 shows the mechanism associated with directly measuring propagation time in the ground.

In order to measure the propagation time of the impulses (tp) in the ground as illustrated in FIG. 5 it is necessary to measure the time difference between the impulse leaving the transmit antenna (tt) and the reflected impulse reaching the receive (tr) antenna. However, this direct measurement is not possible and in practice the time difference is measured between the generated voltage impulse (tg) and the detected voltage impulse (td). The time difference (td) is longer than the propagation time in the ground (tr)–(tt) due to time delays in the cables and couplers feeding the antennas. Thus, unless corrected, the measurement of time difference of the generated and detected voltage impulses will give a systematic error which will overestimate the depth. This problem has been overcome by carrying out a set of time measurements on a material with a range of thicknesses and extrapolating the results to a material thickness of zero. At this point (tt)=(tr) and the time difference measured by the system (to) is caused only by the delays in the cables and components. For a system where the time delays in the cables and connectors are fixed, then the propagation time in the material can be calculated by subtracting (to) from the total measured time:

$$tp=(td-tg)-to$$

Electronic Time Measurement

The velocity of electromagnetic radiation in solid materials is very fast, for instance in bituminous materials, the velocity is in the region of 100 mm/ns. Because of the accuracy of measurement required in this application, of 10 mm or better, then time differences of less than 0.1 ns (100 ps) must be measured. Electronic circuits for the direct measurement of these very short impulses are complex and very expensive and therefore an indirect method is used to measure the time differences. This technique is called down-sampling in which the voltage impulse at the receiver is digitally sampled and stored and then reconstructed over a much longer timescale. The effect is to convert a pulse with a duration of 350 ps to an impulse of 0.35 ms duration.

Figure 6:
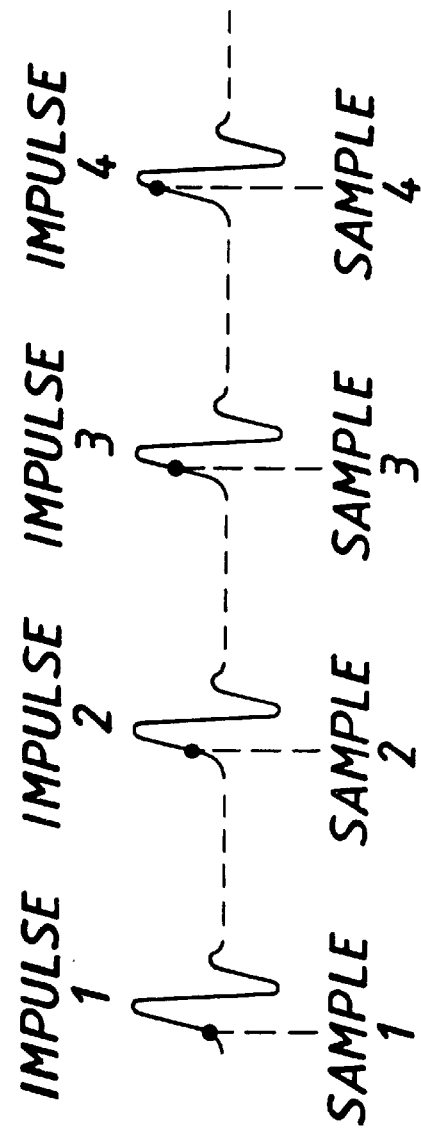
FIG. 6 shows the handling of impulses.

The short duration (350 ps) impulses are generated and passed into the ground at a rate of 160 khz (i.e. 160,000 impulses per second). As each of the reflected impulses are detected by the receive electronics, a single digital sample is taken from a point on the received waveform as illustrated in FIG. 6. For the first impulse received the sample will be taken from the start of the waveform. For each subsequent received impulse, the timing module progressively increments the point on the waveform at which the sample is taken by 6.1 ps. Therefore over a sequence of 4096 impulses (i.e. over a period of 4096/160000 seconds=0.025s=25 ms) the timing module increments the sample time by a total of 4096×6.1 ps=25,000 ps=25 ns). At the end of this sequence, which has taken 25 ms the sampler has effectively sampled a time window of 25 ns for the received signal waveform. This stretching of the time window by a factor of 1,000,000 allows more conventional electronic circuitry to be used to amplify and filter the waveforms prior to digital conversion for processing, display and storage.

Clearly the accuracy of the system depends on measurement of very small time differences between the transmit channel and the receive channel which can be much smaller than relative timing drift between channels caused by temperature and component drift.

In order to substantially eliminate the effects of this drift, our arrangement employs a reference pulse from the transmit signal into the receive channel.

This reference pulse is superimposed on the received waveform. Any change in the timing of the control circuitry which changes the position of the sample of the received waveform will equally affect the position of the reference pulse. Taking timing measurements on the received waveform with respect to the reference pulse rather than to the start of the waveform thus eliminates differential timing drift in all signal paths common to both signals. The only components not included are the antennas and the associated cables. The drift associated with these will be small and predictable, typically substantially below 10 picoseconds.

Figure 7:
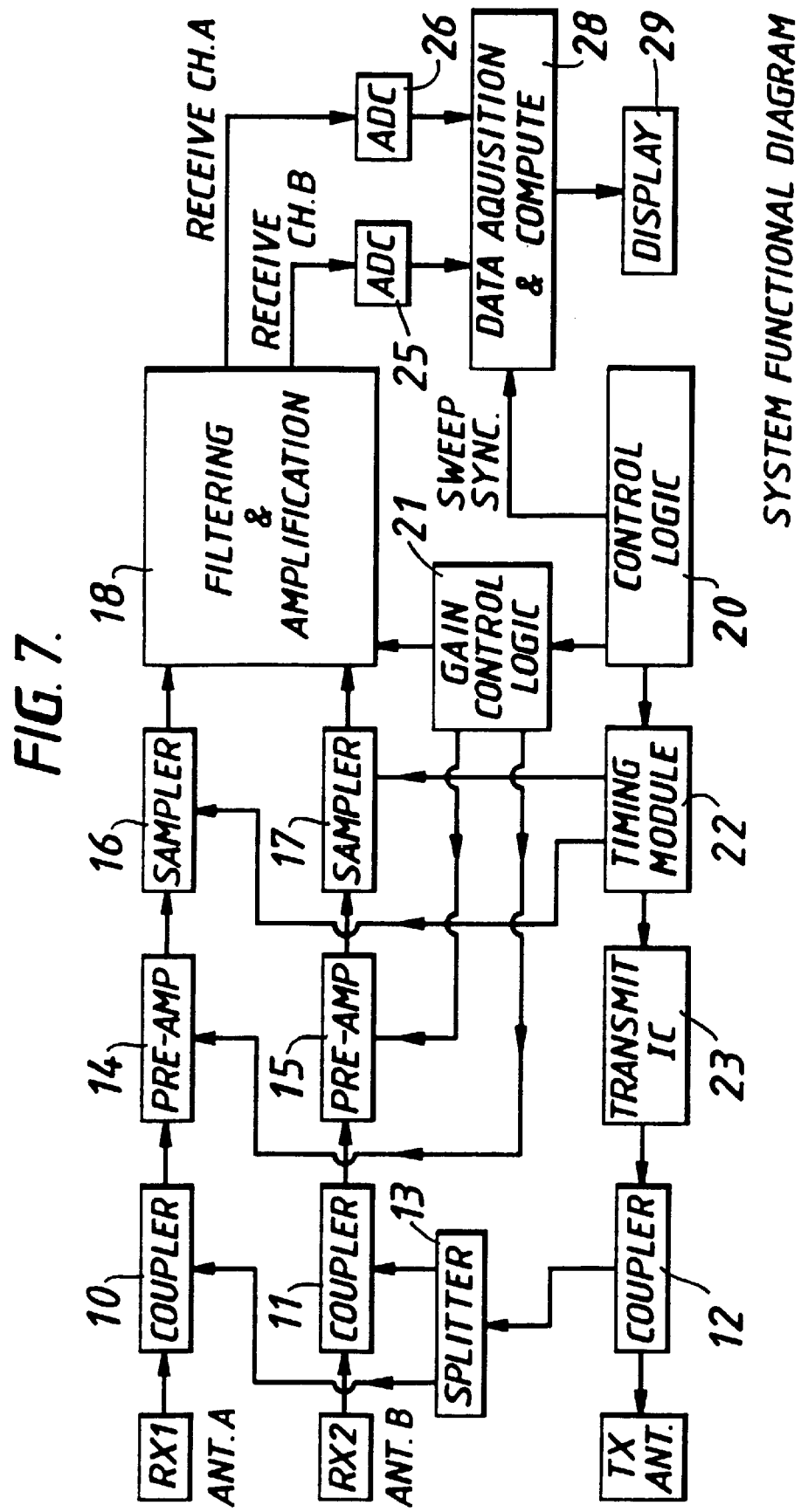
FIG. 7 shows a block diagram arrangement for a system capable of providing the FIG. 4 configuration.

FIG. 7 shows an embodiment suitable for operating in this manner. Couplers 10, 11 and 12 are provided with an associated splitter 13. Received signals are passed to pre-amplifiers 14 and 15 and thence to samplers 16 and 17 acting as sample and hold devices. Filtering and amplification in block 18 provides the output signals for channels A and B.

The control logic block 20 controls system operation including timing module 22.

The control logic module generates the overall timing for the system, generating a transmit rate clock to trigger the sampling timing circuitry and sweep to control the receiver timebase range. It also provides an overall framing signal to define in time the start and finish of a sampling sweep, to ensure correct synchronisation of the data acquisition system.

Figure 8:
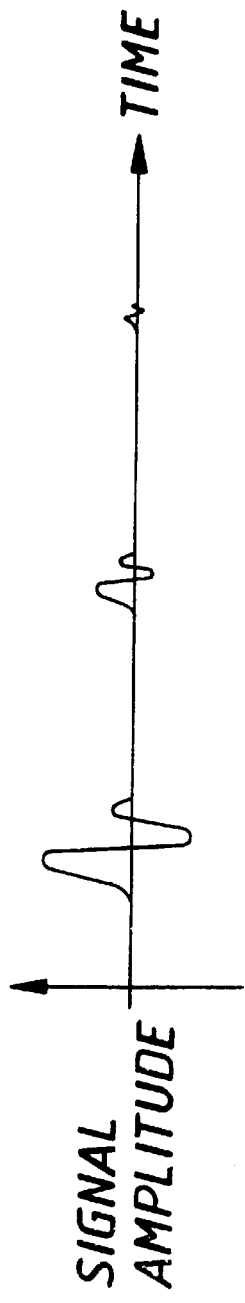
FIG. 8 shows attenuation of signals through their reflection passage.

The gain control logic block 21 controls the level of amplification as required for the time varying gain (described below in relation to FIG. 8). The conditioned analogue signals from channels A and B are digitised in analogue to digital converters 25, 26 and the information taken at the appropriate time by acquisition and computation block 28 which includes a microprocessor. The computed thickness value is made available to display 29 which can provide representation in graphical form for the reflected signals and also a direct depth value in numerical form.

Transmission pulses pass from the transmitter integrated circuit 23 via coupler 12 to the transmit antenna. Splitter 13 provides the reference pulse to the receiving circuitry for timing purposes and appears in the received channel waveform between the start of sweep and the start of the received waveform.

Time Varying Gain

Figure 9:
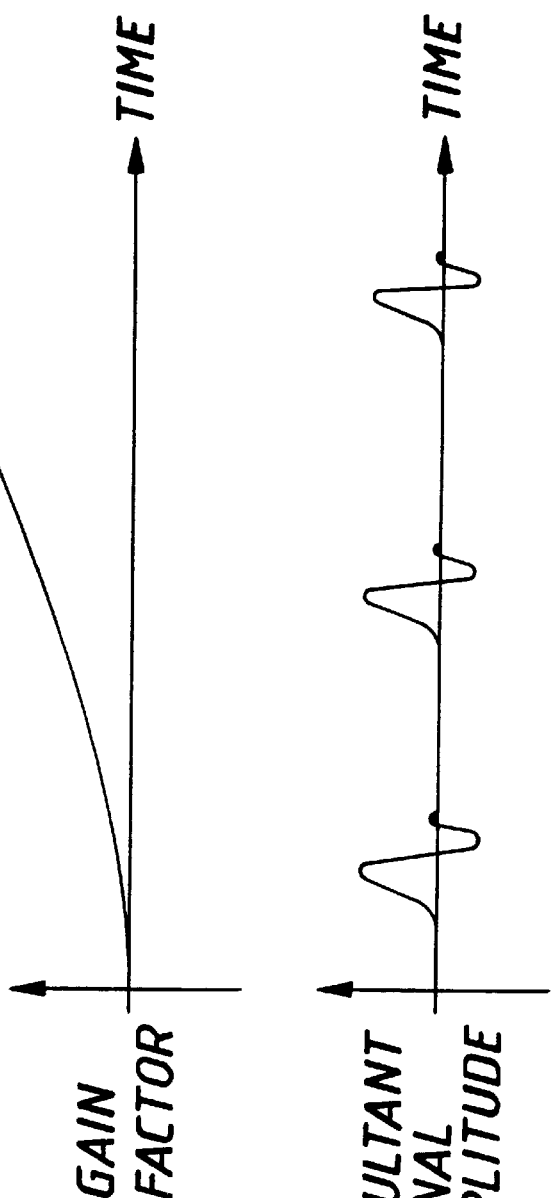
FIG. 9 shows time varying gain to compensate for such attenuation.

Impulses which are reflected from deeper layers in the ground appear later in the waveform of the receiver channel because of the greater distance travelled in the material. These signals are usually more attenuated as shown in FIG. 8 because of the greater distance travelled and measurement of these smaller amplitude signals is more difficult. Compensating gain is applied within the receiver to offset this effect and thus reduce the dynamic range of the received signal. This compensating gain is applied in two stages, before and after the down-sampler. Using Time Varying Gain, it is possible to introduce a greater gain for signals later in the trace than those at the start of the trace as shown in FIG. 9. The degree of additional gain is selectable in steps of 10 db from 0 db to 20 db. This is achieved by means of a function ROM and digital-to-analogue convertor synchronised to the sweep circuitry.

Calculation of Material Thickness

The downsampled waveforms signals are converted to digital signals using the analogue-to-digital convertor. The digitised waveforms are then passed to the microprocessor within block 28 which used conventional processing techniques to automatically locate the peaks in the waveforms and measure time differences. The microprocessor then uses the measured time differences to calculate the material thickness and the value of the thickness is displayed on a numerical display for the operator. New waveforms are received from the downsampler every 25 ms so that a new estimate of material thickness can be made and displayed every 25 ms. If the antenna array is scanned over the area of interest, then a reading of the thickness every 25 ms will provide a detailed profile of the material thickness.

Hence a sweep comprises a sequence of transmit pulses for each of which the samplers are triggered to sample a point on the received waveform. The transmitter and receiver operate at a repetition frequency of approximately 160 khz, constructing a waveform every 25 ms from a sequence of 4096 samples. For each of the transmit pulses the timing module alters the point in time at which the samplers are triggered,sampling a different point on the waveform. This timing increment is such as to alter the transmit to receive timing by a total of 25 ns from the start to the end of the trace, providing a corresponding time window for the receiver. The sequentially sampled waveform from the sampler is amplified and passed through an anti-aliasing filter before being digitised as described above.

The data acquisition circuitry cannot operate at the trigger rate of the sampling system. Therefore, during the period of 25 ms comprising a time trace, the data acquisition converter operates at a reduced conversion rate, digitising the received waveform into 512 points. Thus for each digitised value the RF subsystem has received 8 sample values. The effect of the anti-aliasing filter is to average these 8 values, producing an improvement in received signal-to-noise ratio of approximately 8 dB. An additional benefit of this reduced conversion rate is that the output from the receiver falls within the audio band. This enables the use of low cost high performance devices and software normally used for the digital audio market.

Although the arrangements have been described generally in relation to road thickness measurement, it would be applicable to other non-homogenous civil engineering media.

What is claimed is:

1. A device for measuring a thickness of a non-homogeneous medium, the device comprising:
    means for transmitting pulses of electromagnetic energy through the medium;
    first means for receiving a first reflected energy signal;
    second means spaced from the first means for receiving a second reflected energy signal; and
    means for calculating the thickness of the medium independent of a velocity of the electromagnetic energy through the medium using time measurements indicative of a time for pulses of electromagnetic energy transmitted from the transmitting means to be received by each of the first and second receiving means and the distances of each of the first and second receiving means from the transmitting means.

2. A device as claimed in claim 1, further comprising time manipulation means for effectively expanding a short duration time window to allow relatively slow computation circuitry to be employed in said calculating means.

3. A device as claimed in claim 1, further comprising scanning means for scanning an area of the medium to determine the thickness at a number of locations within the area.

4. A device as claimed in claim 1, wherein the transmitting means, the first and second receiving means, and the calculating means measure a relatively shallow non-homogenous medium.

5. A device as claimed in claim 1, further comprising means for sampling, means for storing and means for reconstructing impulses for allowing time differences in the region of 100 picoseconds to be determined.

6. A device as claimed in claim 1, further comprising reference information means for utilizing information derived from the signal to be transmitted to compensate for signal drift in said transmitting means.

7. A device as claimed in claim 6, further comprising time manipulation means for effectively expanding a short duration time window for relatively slow computation circuitry employed in said calculating means.

8. A device as claimed in claim 1, further comprising means for compensation for pulse attenuation dependent on a transmission path length of said first reflected energy signal or said second reflected energy signal.

9. A device as claimed in claim 8, wherein the compensation means includes means for providing time variable gain based on the transmission path length of said first reflected energy signal or said second reflected energy signal.

10. A device as claimed in claim 1, further comprising sampling means for acquiring sample information of said first and second reflected energy signals;
    means for computing a digital signal derived from the sample information to determine a distance dependent on a passage of the electromagnetic impulse through the medium; and
    display means for displaying a result of the computing means.

11. A device as claimed in claim 10, wherein the transmitting means provides an electromagnetic impulse of a very short duration not exceeding several hundred picoseconds.

12. A device as claimed in claim 1, wherein the means for calculating determines the thickness independent of signal velocity changes based on the constitution of the medium.

13. A device as claimed in claim 12, further comprising reference information means for utilizing information derived from the signal to be transmitted to compensate for signal drift in said transmitting means.

14. A device as claimed in claim 12, further comprising time manipulation means for effectively expanding a short duration time window to allow relatively slow computation circuitry to be employed in said calculating means.

15. A pulse radar method for calculating a thickness of a non-homogeneous medium, the method comprising:
    passing a pulse of electromagnetic energy into the medium from a first location at a surface;

receiving at second and third locations at the surface a reflected pulse; and calculating the thickness of the medium using time measurements indicative of the propagation time of the pulse of electromagnetic energy through the medium to each of the second and third locations and the distances of the second and third locations from the first location.

16. A method as claimed in claim 15, wherein the pulse of electromagnetic energy is generated to be a very short duration not exceeding several hundred picoseconds.

17. A method as claimed in claim 15, further comprising sampling, storing and reconstructing the received information to allow a relatively shallow thickness to be determined.

18. A device for measuring a thickness of a non-homogeneous medium, the device comprising:

a transmitter configured to transmit pulses of electromagnetic energy through the medium;

a first receiver configured to receive a first reflected energy signal;

a second receiver spaced from the first receiver and configured to receive a second reflected energy signal; and a calculating mechanism configured to calculate the thickness of the medium independent of a velocity of the electromagnetic energy through the medium using time measurements indicative of a time for pulses of electromagnetic energy transmitted from the transmitter to be received by each of the first and second receivers and the distances of each of the first and second receivers from the transmitter.

19. A device as claimed in claim 18, wherein the calculating mechanism determines the thickness independent of signal velocity changes based on the constitution of the medium.

20. A device as claimed in claim 18, further comprising a reference information mechanism configured to use information derived from the signal to be transmitted to compensate for signal drift in the transmitter.

21. A device as claimed in claim 18, further comprising a time manipulation mechanism configured to effectively expand a short duration time window to allow relatively slow computation circuitry to be employed in said calculating mechanism.

22. A device as claimed in claim 18, further comprising a scanning mechanism configured to scan an area of the medium to determine the thickness at a number of locations within the area.

23. A device as claimed in claim 18, wherein the transmitter, the first and second receivers, and the calculating mechanism measure a relatively shallow non-homogenous medium.

24. A device as claimed in claim 18, further comprising a sampling mechanism, a storing mechanism and a reconstructing impulse mechanism configured to allow time differences in the region of 100 picoseconds to be determined.

25. A device as claimed in claim 18, further comprising a compensation mechanism configured to attenuate a pulse dependent on a transmission path length of said first reflected energy signal or said second reflected energy signal.

26. A device as claimed in claim 25, wherein the compensation mechanism provides a time variable gain based on the transmission path length of said first reflected energy signal or said second reflected energy signal.

27. A device as claimed in claim 18, further comprising a sampling mechanism configured to acquire sample information of said first and second reflected energy signals;

a computing mechanism configured to compute a digital signal derived from the sample information to determine a distance dependent on a passage of the electromagnetic impulse through the medium; and a display configured to display a result of the computing mechanism.

28. A device as claimed in claim 27, wherein the transmitter provides an electromagnetic impulse of a very short duration not exceeding several hundred picoseconds.

* * * * *